Oct. 22, 1935.  F. WINKLER ET AL  2,018,619
APPARATUS FOR PYROGENIC CONVERSION OF HYDROCARBONS
Filed May 18, 1931  3 Sheets-Sheet 1
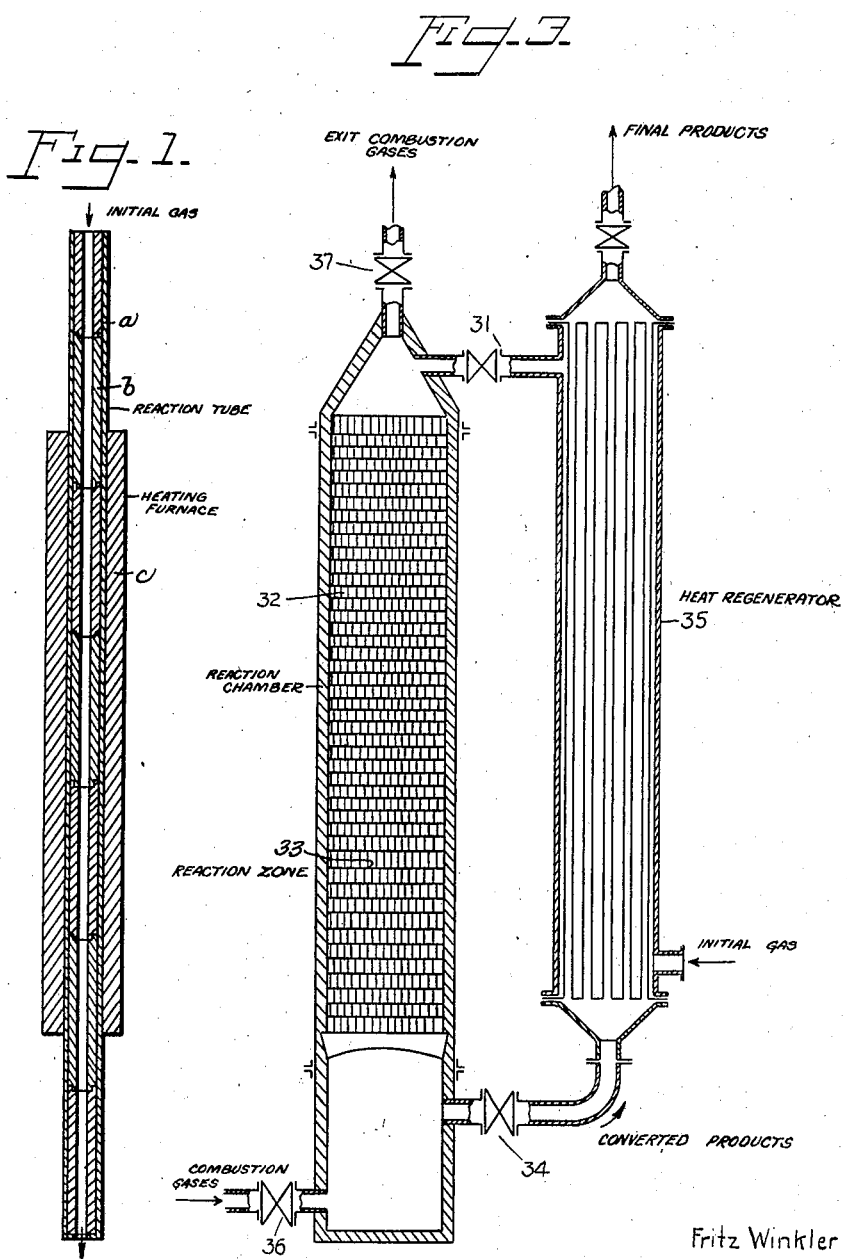
Fritz Winkler
Hans Haeuber
Paul Feiler
INVENTORS
BY *Hauff & Warland*
ATTORNEYS.

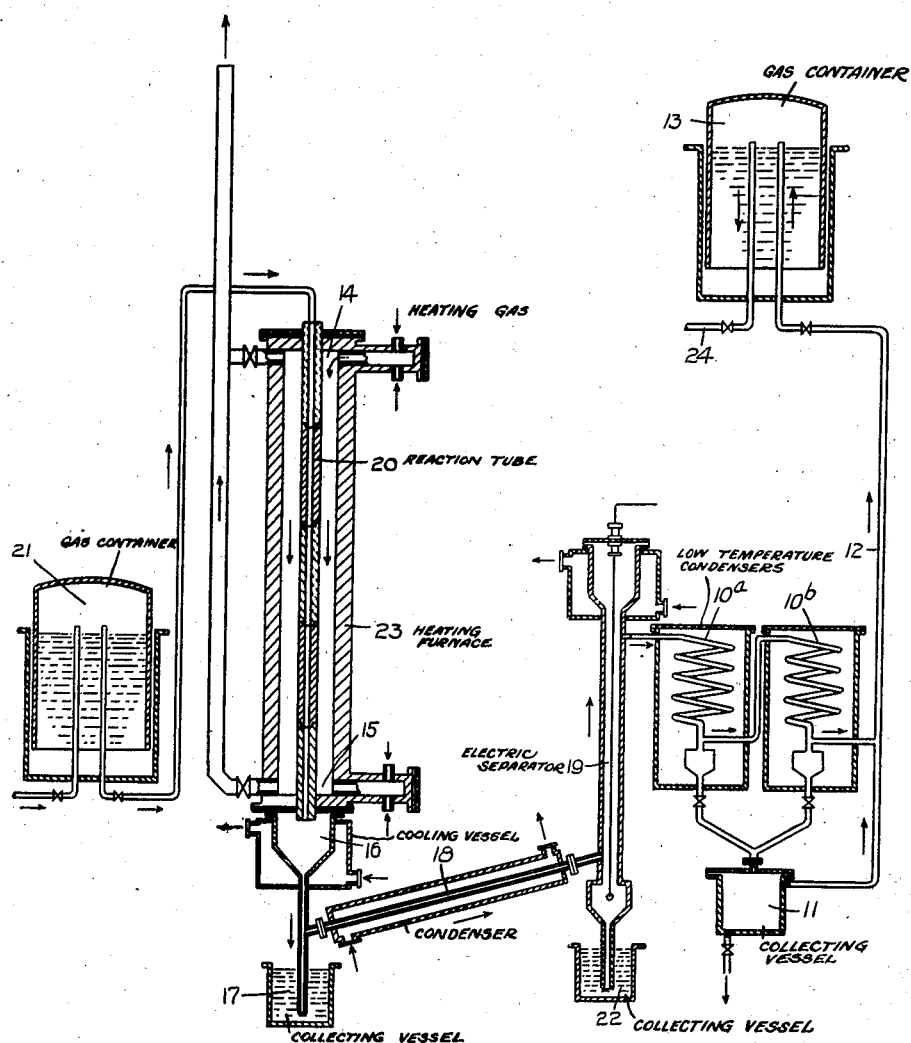

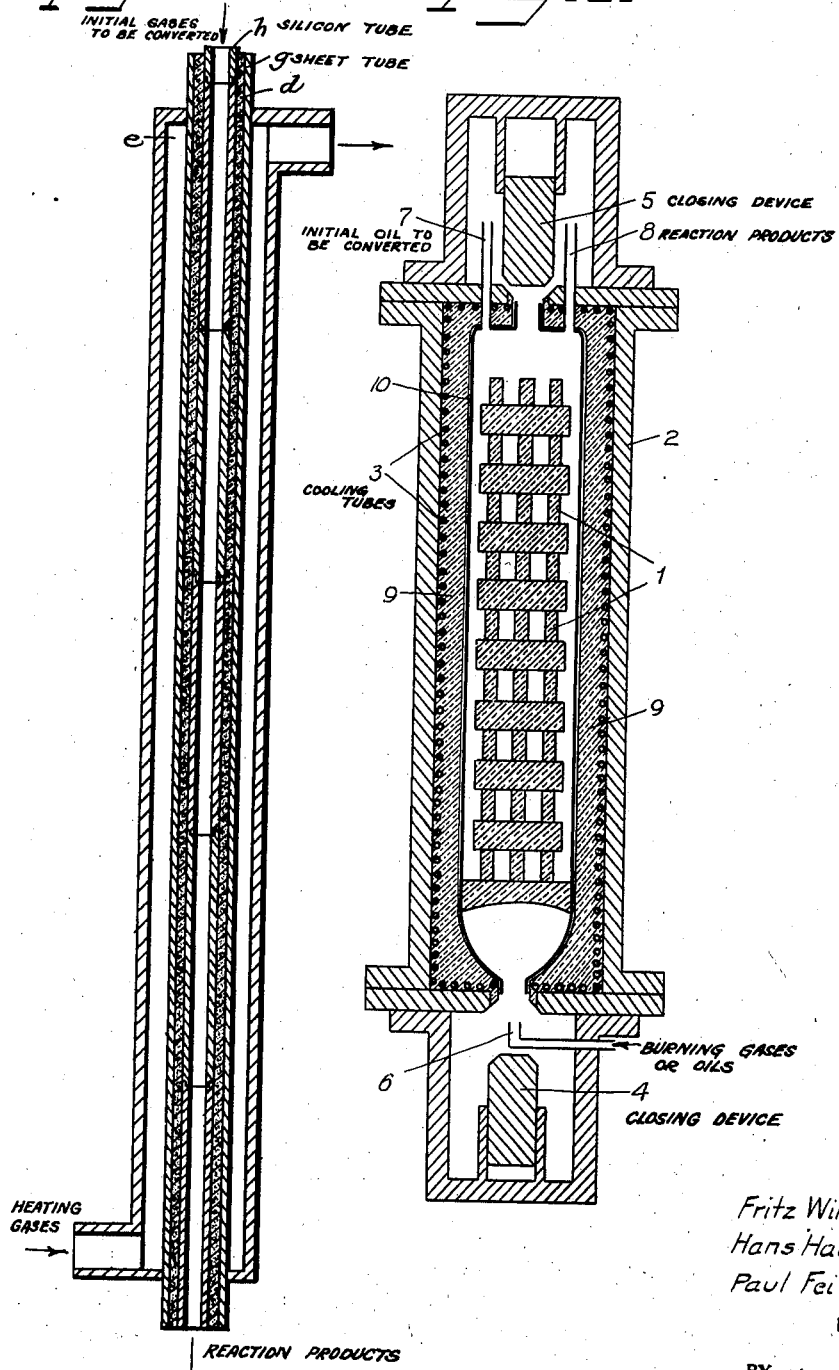

Patented Oct. 22, 1935

2,018,619

UNITED STATES PATENT OFFICE 2,018,619

APPARATUS FOR PYROGENIC CONVERSION OF HYDROCARBONS

Fritz Winkler, Hans Haeuber, and Paul Feiler, Ludwigshafen-on-the-Rhine, Germany, assignors to I. G. Farbenindustrie Aktiengesellschaft, Frankfort-on-the-Main, Germany Application May 18, 1931, Serial No. 538,130
In Germany May 22, 1930

5 Claims. (Cl. 196—10)

The present invention relates to improvements in and apparatus for carrying out the pyrogenic conversion of hydrocarbons.

It has already been proposed to employ elementary silicon or bodies moulded from silicon powder or materials containing elementary silicon together with other substances, as for example ferrosilicon containing more than 60 per cent of silicon, as catalysts in the pyrogenic conversion of hydrocarbons, in particular those carried out in the gaseous or vaporous phase. The wall material for the reaction chambers is either a material comprising silicic acid such as quartz or porcelain, or metals, metal alloys or metal copper alloy or of tinned steel containing about 19 per cent of chromium and 7 per cent of nickel and the like.

There are great objections to these materials when used above 500° C., because they unfavorably influence the reaction by reason of carbon deposits and moreover, especially in the case of metals, as they lose their shape stability at these temperatures.

We have now found that the said objections are avoided by operating in apparatus of which the inner walls exposed to elevated temperatures and confining the space in which the hydrocarbons are treated consist of a substance containing a preponderating amount of elementary silicon. By the term "walls" we mean any constructional element confining the said space which does not need further support for keeping its shape as distinguished from thin layers which will not stand without the support to which they are applied. It is preferable to construct the parts of the apparatus concerned of molded parts prepared from elementary silicon by casting, if desired with an addition of other substances, such as fluxing materials or materials forming slags, or by the methods usual in the ceramic industry, if desired with an addition of a binding agent. As binding agents may be employed readily meltable silicates or other high melting materials used in the ceramic industry, such as clay and cements. This constructional material combines all the good properties of the tested metallic materials, namely good thermal and electrical conductivity, readiness of being worked and good catalytic properties on the one hand, with the high stability to temperature of ceramic materials on the other hand, without having the objection of causing the deposition of carbon, especially of lustrous carbon or carbon black.

Thus tubes moulded from silicon powder are an excellent material, for example, for converting lower olefines into higher gaseous olefines in continuous operation, for preparing liquid hydrocarbons of aliphatic or aromatic nature from olefines, for converting homologues of methane into gaseous olefines or liquid hydrocarbons or for converting high molecular hydrocarbons into lower ones.

Tubes prepared from material obtained from silicon powder with an addition of a binding agent containing silicates and clay are especially suitable for the preparation of liquid aromatic hydrocarbons, especially of benzene from methane or gas mixtures containing the same, because this reaction, in order to obtain satisfactory yields, requires temperatures above 950° C. which exceed the limit of stability of metal tubes.

Contrasted with quartz, porcelain or chamotte tubes no lustrous carbon which scales off or carbon black is formed under otherwise identical conditions, whereby not only an improvement in the total yield of liquid conversion products, but especially of those of lower boiling point (below 100° C.) at the expense of those of higher boiling point, is obtained.

Tubes prepared from material containing elementary silicon may be used embedded in other gas-tight tubes and the whole system may be brought to the desired temperature by external heating. Or the tubes prepared from silicon powder may be coated by suitable means with a gas-tight glaze prepared from a high melting material and may be themselves heated to the desired temperature by an electric current, the cross section of the tubes preferably being enlarged at the entry end. The glazed tube prepared from silicon powder may also be directly exposed to heating in the same manner as porcelain tubes.

The employment of material containing elementary silicon as the constructional material for the parts of the apparatus exposed to high temperatures does not exclude the additional employment of other materials as catalyst.

The cross section of the reaction vessel may have any shape. Instead of a tube, a shaft lined with plates prepared from silicon powder may be used as the reaction chamber.

Silicon is not only of advantage for constructing the parts of the apparatus in which conversion of hydrocarbons in the vaporized phase (which expression is hereinafter intended to comprise the gaseous and the vaporous phase) takes place but may also be used satisfactorily as constructional material for other parts exposed to elevated temperatures, for example for those in which the initial materials are preheated. As a rule it is preferable to construct all parts of the apparatus exposed to temperatures above 200° C. of or to coat them with a material consisting of or containing elementary silicon. This is of particular advantage when treating materials having a high content of easily decomposable constituents, as for example acetylene or diolefines, in which case carbon easily deposits also in the preheating devices when employing the constructional materials hitherto in use among which also the so-called special steels such as chromium nickel steel are not free from the objection of causing the deposition of carbon.

In the parts of the apparatus in which only moderately elevated temperatures prevail, for example those ranging from 200° to 500° C., the elementary silicon may also be used in the form of enamels which are applied to the inner surface of the preheating or reaction vessels.

As further treatments in which gaseous or liquid hydrocarbons are exposed to elevated temperatures, irrespective of whether or not a chemical conversion takes place, and for which apparatus comprising the constructional materials as hereinbefore defined are employed with advantage may be mentioned the distillation of liquid hydrocarbons, hydrogenating treatments, the dehydration or cracking of hydrocarbons (carried out at temperatures ranging from 300° to 1200° C.), the condensation or polymerization of lower gaseous hydrocarbons at ordinary or elevated pressures to form higher gaseous and liquid hydrocarbons (effected at temperatures ranging from 200° to 1200° C.). In all these treatments the employment of constructional materials comprising elementary silicon represents a great advance in the art, since the carbon depositing on the walls of the apparatus hitherto employed caused great inconveniences in particular a considerable decrease in the yield of the desired products.

Also when using special catalysts the employment of constructional materials containing elementary silicon is of advantage, since in this case the deposition on the walls of carbon which scales off and falls down on the catalyst after some time, thus clogging up the catalyst and causing a change in the direction of the reaction, is prevented.

We have now also found that metals, i. e. materials having good thermal conductivity, which are stable to high temperatures, for example 500° C. or more, and stable to elevated pressures at the said temperatures, in particular special steels stable to heat can be employed with excellent results for the preparation of the protecting tubes if a layer be arranged between the metal tube and the silicon tube which prevents the formation of alloys from the two tubes. Chromium-nickel steels are especially suitable for the construction of the devices, for example in the form of tubes protecting the vessels, for example tubes constructed of silicon. It is preferable to make the outer diameter of the silicon tube a few millimeters smaller than the internal diameter of the protecting tube and to fill the intermediate space with a substance which attacks neither the protecting tube nor the silicon tube. As materials for filling the intermediate space may be mentioned metals which do not form an alloy with the protective material or with the silicon, as for example lead, or ceramic materials which melt at a temperature slightly above the working temperature, as for example at from 1100° to 1200° C. and which at 1000° C. form a glaze impermeable to gases. It is especially advantageous to provide the walls of the silicon tube with a glaze which prevents evaporation of the silicon or diffusion of the silicon vapor to the protecting tube. As materials which form a glaze over the silicon tube at the reaction temperature may be mentioned for example a weakly basic cement consisting of equal parts of $SiO_2$ and $Al_2O_3$ or other similar cement. When an alloy is formed from the material of the protecting tube and the silicon, the volume of the protecting tube is increased and in a short time it loses its strength. This is prevented by the intermediate layer.

The said manner of constructing apparatus for pyrogenic gas reactions is not confined to tubular apparatus. Other apparatus of any shape may also be constructed according to the present invention. In this case instead of the tubular constructional elements, small plates, bricks or other elements may be employed.

An intermediate layer of the said kind may also be used with the same result when employing silicides, such as nickel-copper silicide or silicon carbide, or mixtures of silicides and silicon as the constructional material for the inner tube. In these cases also, durable apparatus are obtained which are free from the danger of the formation of alloys.

The employment of metallic protecting tubes, which are lined in the said manner with siliceous constructional material permits one to work at higher pressures, whereby there is no longer any need that the temperatures be limited to the range above 500° C.

Apparatus of the said kind are especially suitable for working up liquids in the vaporized state or gases, or mixtures of both, which contain impurities, as for example sulphur compounds, which attack metal parts of apparatus under the working conditions.

Such initial materials, as for example vapors of mineral oils, tar oils, or cracking gases and the like may therefore be subjected to the desired reactions in the said apparatus without previous purification.

Furthermore apparatus lined with silicon as herein specified may be used at any pressure or temperature for carrying out reactions in which the by-products injurious to the parts of the apparatus hitherto employed are first formed during the reaction, as for example for carrying out reactions in which aluminium chloride is used under pressure.

Such reactions could hitherto only be carried out to a limited extent, since undesirable side-reactions occurred and noxious by-products were formed, as for example hydrogen chloride in the case of working with aluminium chloride.

The expressions "silicon" or "free elementary silicon" when employed in the present specification are intended to comprise both pure silicon and the silicon of commerce, which contains up to about 10 per cent of iron.

The following examples will further illustrate the nature of this invention and are given with reference to the accompanying drawings which illustrate arrangements of apparatus suitable for carrying out this invention, but the invention is not restricted to these examples nor to the arrangements of apparatus shown. Examples 1, 2, 6, 10 and 13 are given with reference to Figures 1, 2, 3, 4 and 5 respectively.

*Example 1*

Figure 1 shows a section through a tubular apparatus suitable for carrying out the process according to the present invention.

Tubes prepared from silicon powder, having an external diameter of from 29 to 30 millimeters and an internal diameter of 10 millimeters are inserted into a quartz tube $a$ 1 meter long and 30 millimeters in internal diameter which is heated externally for about 60 centimeters of its length to about 1030° C. by an electrical heating furnace $c$, so that when the silicon tubes are interlocked they form a tube $b$ having a total length of 1 meter. 60 liters of a gas mixture consisting of 82.5 per cent of methane, 7.5 per cent of nitrogen and 10 per cent of hydrogen are passed through the tube per hour.

65.5 liters per hour of a gas mixture consisting of 63 per cent of methane, 28.3 per cent of hydrogen, 1.8 per cent of unsaturated hydrocarbons (mainly acetylene) and 6.9 per cent of nitrogen leave the reaction chamber. Moreover 3.2 grams of liquid hydrocarbons are formed, 96 per cent of which boil up to 110° C. of which latter 90 per cent consists of benzene and toluene. Thus from each cubic meter of 100 per cent methane 63 grams of liquid hydrocarbons are obtained.

The final gas may be led through a second chamber heated to a high temperature and after separating the products formed may be led through a third chamber.

The formation of naphthalene is extremely small. Even after working for 3 weeks there is no trouble owing to stoppage of the reaction tube by formation of carbon deposits.

*Example 2*

Figure 2 shows in a somewhat diagrammatic manner a plant, partly in section, which may be employed with advantage for carrying out conversions of fluid hydrocarbons at elevated temperatures.

A vertical tube 20 5 meters in height and 15 millimeters in internal diameter which is constructed of a material containing more than 80 per cent of free silicon and which is provided with an external refractory coating is heated in the furnace 23 with a gas flowing downwards round the tube and which has a temperature of about 1000° C. when it enters at 14 and a temperature of about 850° C. when it leaves the furnace at 15.

Through the said tube 20 are passed downwardly 900 liters per hour of a gas supplied from container 21 having the following composition (the percentages are given by volume): 5.7 per cent of ethylene, 24.4 per cent of ethane, 3.5 per cent of propylene, 11.1 per cent of propane, 0.5 per cent of butylene, 2.4 per cent of butane, 38.3 per cent of methane, 6.4 per cent of hydrogen and 7.7 per cent of nitrogen. After the liquid portions have been separated from the resulting products 1240 liters of a gas mixture having the following composition are obtained (the percentages being given by volume): 16.0 per cent of ethylene, 0.2 per cent of propylene, 51.0 per cent of methane, 27.2 per cent of hydrogen and 5.6 per cent of nitrogen.

The reaction gas leaving the tube 20 is cooled in cooling vessel 16 and then passed by way of the condenser 18 into the electric separator 19 in which the nebular substances contained in the gases are precipitated. These substances may then be collected in vessel 22. Liquid products condensed in the cooling vessel 16 and in the condenser 18 flow into the collecting vessel 17. The gases are thereupon conveyed into the low-temperature condensers 10ᵃ and 10ᵇ in which the lower boiling constituents are condensed. The said low boiling substances are collected in vessel 11. The uncondensed parts and the gases vaporized at ordinary temperature from the deeply cooled condensed liquids are led by way of pipe 12 to the gas container 13 from which they may be withdrawn by pipe 24.

173 grams of liquid products are thus obtained of which 115 grams boil up to 100° C. and further 7 grams to 180° C. These products mainly consist of benzene, toluene, xylene and small amounts of non-aromatic hydrocarbons. The part boiling above 180° C. (amounting to 51 grams) mainly consists of naphthalene, alkylated naphthalene and higher aromatic compounds. No deposition of carbon or formation of soot is observed in the reaction tube even after working for several days.

1240 liters of a gas consisting of 51 per cent by volume of methane, 16.0 per cent of ethylene, 0.2 per cent of higher olefines, 27.2 per cent of hydrogen and 5.6 per cent of nitrogen are obtained per hour as final gas. This final gas may be subjected to a further similar treatment, if desired. Due to its extraordinarily small content of higher olefines it may also be used for the production of pure ethylene.

*Example 3*

195 grams of vaporized hexahydrobenzene are passed hourly through a tube constructed of silicon 10 millimeters in internal diameter which is embedded in a porcelain tube and filled with pieces of silicon and which is externally heated to a temperature of 750° C. over a length of 60 centimeters. 65 grams of hexahydrobenzene per hour are thus converted into 13 grams of liquid hydrocarbons boiling below 100° C., 19.5 grams of butadiene (recovered by cooling to low temperatures) and 33 liters of a gas having the following composition (the percentages being given by volume): 1.0 per cent of carbon dioxide, 6.2 per cent of propylene, 30.5 per cent of ethylene, 33.9 per cent of hydrogen, 16.4 per cent of methane, 10.5 per cent of ethane and 1.5 per cent of nitrogen. No carbon is deposited even after working for several hours.

*Example 4*

Through a silicon tube 10 millimeters in internal diameter which is embedded in a copper tube and heated to 700° C. over a length of 60 centimeters German mineral oil of which 7 per cent by weight boil up to 200° C., is distilled in such a manner that the undecomposed oil flows back continuously into the still. From 300 cubic centimeters of oil daily used are obtained 47 cubic centimeters of liquid, mainly aliphatic hydrocarbons boiling below 200° C., and 155 liters of a gas having the following composition (the percentages being given by volume): 0.6 per cent of carbon dioxide, 41.2 per cent of olefines, 13.4 per cent of hydrogen, 41.8 per cent of gaseous hydrocarbons of the methane series and 3.0 per cent of nitrogen. The tube is free from deposits of carbon even after long periods of working.

*Example 5*

620 liters of a gas consisting of 87.8 per cent by volume of methane, 5.8 per cent of hydrogen and 6.4 per cent of nitrogen together with the vapors of 773 grams of an American mineral oil fraction boiling between 200° and 300° C. rich in paraffins are passed per hour through a tube 2.6 meters in length and 15 millimeters in internal diameter which is constructed in the manner described in Example 2 and heated with heating gases flowing downwards round the tube and which have a temperature of about 910° C. when they enter, and a temperature of about 770° C. when they leave. From the materials leaving the vessel are obtained 460 grams of products liquid above 0° C. and 1000 liters of a gas having the following composition (the percentages being given by volume): 13.3 per cent of ethylene, 4.0 per cent of propylene, 66.3 per cent of methane, 12.4 per cent of hydrogen and 4.0 per cent of nitrogen. From each 100 parts by weight of initial oil 0.9 part is converted into hydrogen, 10.4 parts into methane, 20.0 parts into ethane, 9.0 parts into propylene, 11.2 parts into hydrocarbons having at least 4 carbon atoms in the molecule and boiling up to 45° C. 13.5 parts into hydrocarbons boiling between 45° and 180° C. and 35 parts into hydrocarbons boiling above 180° C. The portion of the resulting products boiling up to 180° C. consists of aliphatic and aromatic hydrocarbons, the portion boiling above 180° C. in addition to small amounts of naphthalene, alkyl naphthalene and other higher aromatic hydrocarbons contains unconverted initial material.

*Example 6*

Figure 3 shows another apparatus, partly in section, which is suitable for the conversion of hydrocarbons.

Referring to this figure in detail, a reaction chamber is filled and lined with bricks 32 moulded from elementary silicon. The reaction chamber is heated in the lower part to a temperature of about 1100° C. by means of combustion gases introduced at 36. The upper part of the chamber, which serves as a preheater in the subsequent reaction period, is heated to such an extent that the combustion gases leave the reaction chamber 37 at a temperature of about 500° C. After closing 36 and 37, 90 per cent methane, preheated to about 500° C. in the regenerator 35, is led through 31 with a slowly decreasing velocity of flow of about from 3 to 2 meters per second. The methane is further heated in 32 and then passes into the reaction zone proper 33. The reaction gases and vapors leave the reaction chamber at 34 and heat the methane in the regenerator 35 to 500° C. The reaction gases and vapors leaving the regenerator 35 pass through a cooler into the condensing plant (not shown). 47 grams of condensate containing about 60 per cent of benzene are obtained from each cubic meter of methane by a single passage through the said apparatus. The final gas still contains 65 per cent of unchanged methane. The combustion gas and the combustion air are preheated by the hot gases leaving the reaction chamber.

*Example 7*

A gas obtained by heating rapidly pulverized brown coal for a very short time to about 800° C. and then rapidly cooling the gas, from which the constituents liquid at ordinary temperature have been removed and which consists of 22.2 per cent by volume of carbon dioxide and hydrogen sulphide, 21.4 per cent of olefines, 14.8 per cent of carbon monoxide, 17.4 per cent of hydrogen, 20.2 per cent of methane, 3.8 per cent of nitrogen, is passed through a Cowper 3.7 meters in height and 26 centimeters in internal diameter which is internally coated with plates of silicon, filled with pieces of silicon as heat retaining material and heated to an average temperature of 750° C. 55 grams of liquid hydrocarbons containing 85 per cent by weight of benzene are obtained from each cubic meter of initial gas. After being subjected to condensation the gas contains 11.4 per cent by volume of olefines (mainly ethylene) and may again be subjected to conversion.

*Example 8*

A mixture of from 2 to 3 of a 90 per cent methane and from eight to ten times the amount of steam preheated to 200° C. is passed per hour through a tube, 15 millimeters in internal diameter and 1 meter in length prepared from elementary silicon as described in Example 2 which is heated to about from 900° to 950° C. and filled with pieces of a catalyst consisting of chromic anhydride and nickel nitrate. After separating the steam from the reaction products a gas is obtained consisting of 75 per cent by volume of hydrogen, 4 per cent of unchanged methane, 15 per cent of carbon dioxide, 4 per cent of carbon monoxide and 2 per cent of nitrogen and traces of unsaturated compounds.

*Example 9*

25 liters of a 95 per cent ethylene is passed per hour through a chromium-nickel tube 15 millimeters in internal diameter which is internally coated with a layer of an enamel (consisting of 20 parts of potassium feldspar, 45 parts of borax, 4 parts of fluorspar and 3 parts of silicon) and which is externally heated over a length of 900 millimeters to a temperature of 800° C. From each cubic meter of initial gas 190 grams of a condensate are obtained of which 60 per cent boiling up to 200° C. mainly consist of benzene.

The part boiling above 200° C. consists mainly of naphthalene. In addition thereto 1.2 cubic meters of a gas consisting of

| | Per cent by volume |
|---|---|
| Ethylene | 56 |
| Carbon monoxide | 2 |
| Hydrogen | 17.6 |
| Methane | 24.0 |
| Nitrogen | 0.4 | are obtained from each cubic meter of initial gas. Even after operating for several days no clogging of the tube by precipitated carbon occurs.

*Example 10*

This example is given with reference to Figure 4 showing a vertical section of a Cowper suitable for carrying out the process according to the present invention. The vacant space of this Cowper 4.50 meters in height and 0.44 meter in internal diameter is filled with pieces of silicon I serving as heat regenerator. The pressure resistant wall 2 constructed of a suitable metal resistant to pressure is provided at its inner surface with cooling tubes 3, through which water is passed. The said wall 2 surrounds a wall of fire clay 9 15 centimeters thick which is internally coated with thin plates 10 of silicon. The vacant space may be opened and closed at the top and at the bottom by closing devices 5 and 4 respectively set in motion by hydraulic means.

The heating of the Cowper is effected by means of burning gases or oils supplied by burner 6. After heating up the Cowper to a medium temperature of 650° C. and closing the vacant space by devices 4 and 5 a brown coal tar distillate boiling from 200° to 350° C. which is preheated to 550° C. is pumped in through pipe 7 until the pressure in the Cowper is raised up to 25 atmospheres. While continuously supplying oil the vapors and gases formed are withdrawn by pipe 8 (which may also be arranged at the bottom of the Cowper) in such an amount that the pressure of 25 atmospheres is maintained. In this manner 145 kilograms of oil are passed through per hour. By subjecting the reaction products to cooling and subsequent absorption by means of active charcoal are obtained 99 kilograms of an oil containing 48 per cent of hydrocarbons boiling below 200° C. and of which a great portion consists of benzene, and 47 cubic meters of a gas consisting of 2 per cent of carbon dioxide, 5.8 per cent of olefines, 5.0 per cent of carbon monoxide, 7.8 per cent of hydrogen, 76.3 per cent of hydrocarbons of the formula $C_nH_{2n+2}$ (the average value of $n$ being 1.3) and 3.1 per cent of nitrogen. The resulting gas may be employed for the production of benzene by the usual methods, the waste thereby obtained being employed for heating the reaction chambers.

In a similar manner condensations of gaseous olefines or homologues of methane to form liquid hydrocarbons may be effected in the Cowper described.

Example 11

8.5 liters of a 97 per cent ethylene are passed per hour at a pressure of 50 atmospheres through a high pressure tube of chromium nickel steel 10 millimeters in internal diameter which is internally coated with an enamel consisting of 97 per cent of a sodium-potassium glass and 3 per cent of elementary silicon and which is heated by means of an electric furnace to from 450° to 470° C. over a length of 600 millimeters. By cooling the gases leaving the tube to room temperature and then to about 80° below zero C. 266 grams of a condensate are obtained after 52 hours of which 85 per cent boiling up to 200° C. are mainly composed of non-aromatic olefinic hydrocarbons. In addition thereto 190 liters of a gas consisting of 0.3 per cent by volume of carbon dioxide, 21.0 per cent of propylene and butylene, 34.6 per cent of ethylene, 7.1 per cent of hydrogen, 34.4 per cent of hydrocarbons having the formula $C_nH_{2n+2}$ (the average value of $n$ being 1.6) and 2.6 per cent of nitrogen is obtained. No deposition of carbon can be observed even after working for 3 days.

Example 12

1000 liters of a cracking gas containing sulphur compounds are passed per hour under a pressure of about 100 atmospheres and at temperatures of from 440° to 460° C. through a tube 160 centimeters in length and 10 millimeters in internal diameter which has been prepared from a material containing silicon and which is embedded in a tube of metal externally heated by means of superheated steam. From each cubic meter of cracking gas consisting of 64 per cent of methane, 28 per cent of ethylene, 2 per cent of hydrogen sulphide and carbon dioxide, 0.6 per cent of hydrogen and 5.4 per cent of nitrogen, 110 grams of a low boiling condensate are obtained of which 85 per cent boil from 35° to 150° C., which consists mainly of unsaturated aliphatic hydrocarbons and which is excellently suitable for the production of high viscous lubricating oils.

A noxious deposition of carbon cannot be observed even after operating for several weeks, whereas a tube constructed for example of chromium nickel steel is clogged up after a few hours by deposited carbon.

Example 13

Figure 5 shows a vertical section of an apparatus in which a layer is arranged between the reaction tube comprising elementary silicon and the metal tube resistant to pressure.

A tube $h$ prepared by pressing silicon powder with the aid of a binding agent and consisting of separate sections about 25 centimeters long is inserted in a chromium nickel steel tube $g$ 3 meters long and 50 millimeters in internal diameter which is provided with a heating jacket. The external diameter of the silicon tube is 45 millimeters, and the internal diameter 15 millimeters. A cement powder consisting mainly of aluminium silicate is charged into the space $d$ between the two tubes. The apparatus is then heated by means of watergas so that the temperature in the whole heating space never exceeds from 1150° to 1170° C. and is about 950° C. at the measuring point $e$. A gas consisting to the extent of 80 to 90 per cent of methane is led through the silicon tube at a speed of about 210 liters per hour. From the reaction products leaving the tube are obtained on an average from 60 to 70 grams of liquid products per cubic meter of methane. Two thirds of the products boil up to 100° C. and consist mainly of benzene while the remainder is composed of aromatic hydrocarbons of high boiling point such as toluene, xylene, naphthalene, alkyl naphthalenes, anthracene and the like.

After working uninterruptedly for more than three weeks, neither a decrease in the strength of the apparatus nor any injury to the course of the reaction by reason of the deposition of carbon can be detected.

Example 14

A chromium nickel steel tube having the same dimensions as specified in Example 13 and which is internally coated with a layer of lead is heated to a temperature above 300° C., whereby the main part of the lead flows off and only a thin layer of this metal adheres to the tube. A tube consisting of silicon is then inserted in the said steel tube in the manner described in the foregoing example, so that no free space remains between the two tubes. These tubes give the same results as those obtained in Example 13.

After working for about 48 hours the silicon and the steel had not alloyed nor formed a solution in each other as is the case with tubes which are not separated by a layer of lead.

What we claim is:

1. An apparatus for treating a hydrocarbon in the vaporized state at an elevated temperature the walls of which exposed to said temperature and coming into contact with said hydrocarbon consist of a material prepared by burning a moulded mixture of elementary silicon with an addition of a ceramic binding agent.

2. An apparatus for the conversion at an elevated temperature of a hydrocarbon in the vaporized state, the inner wall of which exposed to the said temperature consists of a material comprising a preponderating amount of elementary silicon and which comprises a further wall of a steel resistant to pressure at elevated temperatures surrounding said inner wall and a layer of a substance between the inner and the outer walls preventing the formation of an alloy from said silicon and said steel, and selected from the class consisting of lead and ceramic materials.

3. The apparatus defined in claim 2 wherein the layer of material between the inner and outer walls is of cement.

4. The apparatus defined in claim 2 wherein the layer of material between the inner and outer walls is of a weakly basic cement of equal parts of silicon dioxide and aluminium oxide.

5. The apparatus defined in claim 2 wherein the layer of material between the inner and outer walls is of lead.

FRITZ WINKLER.
HANS HAEUBER.
PAUL FEILER.